US011470520B2

(12) United States Patent
England (10) Patent No.: US 11,470,520 B2
(45) Date of Patent: Oct. 11, 2022

(54) PARALLEL ROUTING FOR WIRELESS HANDOFFS

(71) Applicant: T-Mobile USA, Inc., Bellevue, WA (US)

(72) Inventor: Jonathan England, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 29 days.

(21) Appl. No.: 17/191,337

(22) Filed: Mar. 3, 2021

(65) Prior Publication Data
US 2022/0286926 A1 Sep. 8, 2022

(51) Int. Cl.
*H04W 36/00* (2009.01)
*H04W 40/36* (2009.01)
*H04W 36/08* (2009.01)

(52) U.S. Cl.
CPC ........... *H04W 36/00835* (2018.08); *H04W 36/0016* (2013.01); *H04W 36/0077* (2013.01); *H04W 36/08* (2013.01); *H04W 40/36* (2013.01)

(58) Field of Classification Search
CPC ....... H04W 36/00835; H04W 36/0016; H04W 36/0077; H04W 36/08; H04W 40/36
See application file for complete search history.

(56) References Cited

U.S. PATENT DOCUMENTS

| 2005/0073990 | A1* | 4/2005 | Chang | H04W 36/0007 370/352 |
| 2011/0159891 | A1* | 6/2011 | Segall | H04W 64/00 455/456.3 |
| 2017/0180090 | A1* | 6/2017 | Park | H04W 28/16 |
| 2018/0152876 | A1* | 5/2018 | Gu | H04W 36/18 |

* cited by examiner

*Primary Examiner* — Hashim S Bhatti
(74) *Attorney, Agent, or Firm* — Lee & Hayes, P.C.

(57) ABSTRACT

Systems, devices, and techniques described herein relate to parallel routing of data packets prior to and/or during a handoff event for a user equipment (UE) between cells. An example method includes determining, by a network device, that a UE is about to participate in a handoff event while the network device is transmitting data packets associated with a service to a cell currently in communication with the UE. The network device may determine a destination cell in which the UE will be performing the handoff with and may replicate the data packets and send the data packets to both of the current cell and the destination cell in parallel. When the UE performs the handoff with the destination cell, the data packets required for receiving the service will already be present and the UE will not experience any interruption in the service prior to and/or during the handoff.

20 Claims, 8 Drawing Sheets

PARALLEL ROUTING FOR WIRELESS HANDOFFS

BACKGROUND

Cellular communication devices use network radio access technologies to communicate wirelessly with geographically distributed cellular sites (e.g., base stations). Real-time communication services (e.g., instant messaging, voice-over (Vo) internet protocol (IP) video calling, navigation control of autonomous vehicles, online gaming, etc.) operating on a user equipment (UE) require ultra-low latency of data packets being routed to a cell connected to the UE because media being provided by the real-time communication is not typically able to be buffered against interruptions in data transmission. A handoff latency is often associated with a handoff of the UE from a first cell to a second cell, causing interruption of the media being provided via the real-time communication service. Thus, there is a need to reduce the latency in which a UE receives data packets for real-time communication when the UE is experiencing a handoff.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques for parallel transmission of data packets (e.g., real-time data packets) to multiple cells before and during a handoff of communication sessions between a first cell and a second cell are discussed herein. In various implementations, a network device may receive an indication from a user equipment (UE) that the UE is about to experience a handoff from the first cell to the second cell. In response, the network device may begin sending (e.g., replicating) data packets to both (e.g., in parallel) the first cell and the second cell (e.g., destination cell). This results in an uninterrupted service, and imperceptible dovetailing within the user experience.

In some cases, the network device may initiate parallel transmission of data packets before and during handoffs without the UE initiating or requesting the handoff. The network device may monitor a radio signal associated with the UE and/or other metrics associated with the UE and/or the network and determine that the UE will be experiencing a handoff within a determined amount of time. In one implementation, the network device may estimate which destination cell the UE is moving to, and begin transmitting the data packets of the service in parallel to both the current cell and the destination cell simultaneously. The estimation may be based on triangulation or other ways of knowing where the UE is located within a coverage area of the current cell. In another implementation, the network device may transmit (e.g., multicasts) the data packets of the service in parallel to all neighboring cells (e.g., 4-5 cells, for example).

Conventional operation for transmitting data packets of services to a UE when the UE is experiencing a handoff includes a first cell site forwarding the data packets to a destination cell site and reordering the data packets at the destination cell site. This delay in service causes pixilation and choppy action in real-time video calls, interactive games, and impermissible delay in reliant devices such as autonomous vehicles.

By implementing parallel data packet transmissions, the UE may experience availability of data packets of interactive services (e.g., real-time interactive services) seamlessly, as the data packets are already present and available in order at the new cell site when the mobile device switches over to it. This provides a seamless transition for real-time user interaction on the mobile device during handoffs.

In some implementations, a network device may be transmitting data packets of a service, such as a real-time service (e.g., instant messaging, voice-over (Vo) internet protocol (IP) video calling, navigation control of autonomous vehicles, online gaming, etc.) to a first cell (e.g., base station) located within a first coverage area. The first cell may be in communication with a UE and provide the data packets to the UE while the UE is located at a first position. The network device may receive an indication from the UE that the UE is about to experience a handoff from the first cell to a second cell located within a second coverage area. In some cases, the indication that the UE provides the network device may include identifying information associated with the second cell (e.g., cell identifier) and/or timing data indicating a time in which the UE expects to handoff to the second cell. Once the network device receives the indication from the UE (e.g., identifying information associated with the second cell and/or timing data), the network device may transmit the data packets to both the first cell and the second cell in parallel.

In some cases, after the UE has moved from the first position to a second position located within the second coverage area, the network device may execute the handoff such that the UE begins a communication session with the second cell. After the UE and/or the second cell initiates the communication session, the network device may cease from providing data packets to the first cell and continue to provide data packets to the second cell. The network device may repeat the process as the UE moves to different coverage areas and experiences handoffs with a number of different cells.

In some cases, after the UE has provide an indication to the network device that the UE is going to experience a handoff, the network device may determine which second cell (e.g., destination cell) to provide the data packets to in parallel with the first cell (e.g., current cell). For example, in some cases, the network device may determine the second cell based on location information associated with the UE. In some cases, the location information may be provided to the network device by the UE. In other cases, the network device may triangulate the location of the UE with respect to an edge of the first coverage area. Once the network device determines a location of the UE, the network device may determine which second cell that the UE will be performing the handoff with and begin sending the data packets to both the first cell and the second cell in parallel.

In some examples, the network device may transmit data packets to multiple cells in parallel prior to the UE performing the handoff. For example, the network device may determine a number of neighboring cells relative to the first cell (e.g., current cell). In some cases, the network device may receive a neighbor list from the first cell and/or the UE identifying the neighboring cells. The network device may transmit the data packets to the neighboring cells (e.g., multicast to the neighboring cells) based on the identifying information in the neighbor list. In some cases, the network device may receive the neighbor list and select one or more of the neighboring cells in which to send the data packets to in parallel with the first cell.

In some cases, the network device may determine to transmit data packets to the first cell and the second cell (and/or multiple other cells) in parallel based on network metrics associated with the UE and/or the network. For example, the network device may monitor, or otherwise receive, network metrics associated with the UE (e.g., signal strength, call quality, etc.) and determine that one or more metrics have dropped below a threshold. In some cases, the network device may determine that the UE will participate in a handoff with the second cell based on the one or more metrics dropping below the threshold and start transmitting the data packets to both the first cell and the second cell (and/or multiple other cells) in parallel. This is just one example implementation and other examples are discussed throughout this disclosure. Example implementations are provided below with reference to the following figures.

Figure 1:
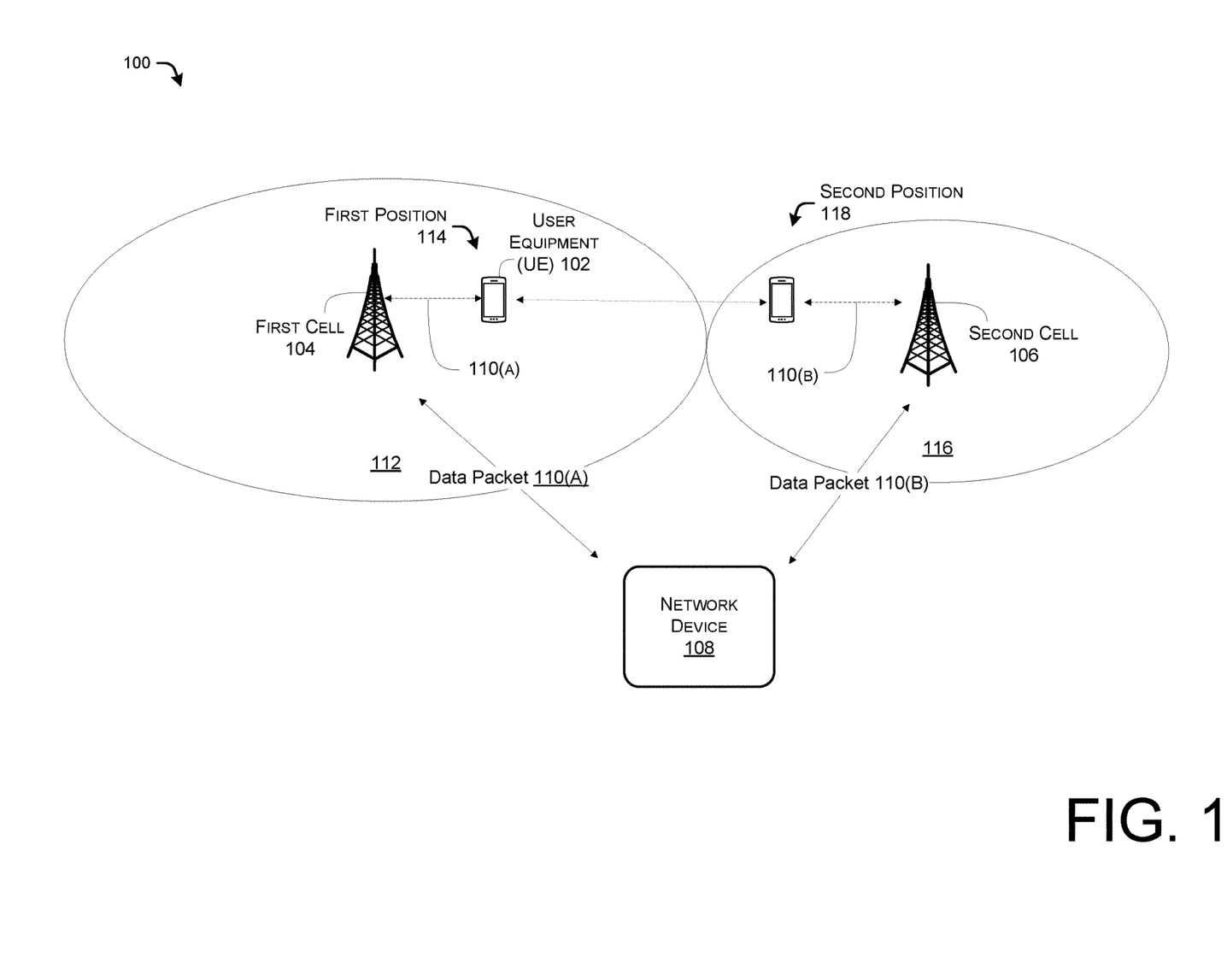
FIG. 1 illustrates an example environment for parallel routing of data packets prior to and/or during a handoff event.

FIG. 1 illustrates an example environment 100 for parallel data packet transmitting before and/or during a handoff event of a UE 102 between a first cell 104 and a second cell 106 that may be in communication via a telecommunication network. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device.

As used herein, the terms "UE," "user device," "wireless communication device," "wireless device," "communication device," "mobile device," "client device," and "terminal" can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over Internet Protocol (IP) (VoIP), VoLTE, Institute of Electrical and Electronics Engineers' (IEEE) 802.1 x protocols, WiMAX, Wi-Fi, Data Over Cable Service Interface Specification (DOCSIS), digital subscriber line (DSL), and/or any future IP-based network technology or evolution of an existing IP-based network technology.

The telecommunication network can have one or more access networks that include base stations and/or other access points, as well as a network device 108 linked to the access network. The access networks and/or the network device 108 can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The UE 102 can wirelessly connect to one or more base stations (e.g., the first cell 104 and/or the second cell 106) or other access points of the access networks, and in turn be connected to the network device 108 via the base stations or other access points. In some examples, the network device 108 can be a packet core network of an LTE network, which may be referred to as an Evolved Packet Core (EPC). In other examples, the network device 108 can be a 5G core network.

The access networks can include the first cell 104 and the second cell 106 that communicate with the UE 102, and the network device 108, as well as other UEs and other cells not illustrated in FIG. 1. In some cases, the first cell 104 and the second cell 106 may be associated with an LTE access network known as an Evolved UMTS Terrestrial Radio Access Network (E-UTRAN). Cells of the LTE access network can be known as eNBs. In some cases, the first cell 104 and the second cell 106 may be associated with a 5G access network with cells known as gNBs.

The first cell 104 and the second cell 106 can be connected to the network device 108. For example, the first cell 104 and the second cell 106 may be connected to the network device 108 via 51 interfaces, or other interfaces, for transmission of user plane data and/or control plane data. The first cell 104 and the second cell 106 may also be connected to other cells over an X2 interface, or other interface, for transmission of user plane data and/or control plane data.

In some implementations, the network device 108 may transmit data packet(s) 110(a) of a service, such as a real-time service (e.g., instant messaging, voice-over (Vo) internet protocol (IP) video calling, navigation control of autonomous vehicles, online gaming, etc.) to the first cell 104 (e.g., base station) located within a first coverage area 112. The first cell 104 may be in communication with the UE 102 and provide the data packet(s) 110(a) to the UE 102 while the UE 102 is located at a first position 114. In some cases, the network device 108 may receive an indication (e.g., notification, message, signal, etc.) from the UE 102 that the UE 102 is about to experience a handoff from the first cell 104 to the second cell 106 located within a second coverage area 116. In some cases, the indication that the UE 102 provides the network device 108 may include identifying information associated with the second cell 106 (e.g., cell identifier) and/or timing data indicating a time in which the UE 102 expects to handoff to the second cell 106. Once the network device 108 receives the indication from the UE 102 (e.g., identifying information associated with the second cell 106 and/or timing data), the network device 108 may transmit data packet(s) 110(b) to the second cell 106 and data packet(s) 110(a) to the first cell 104 in parallel. In some examples, the data packets 110(a) and the data packets 110(b) may include the same content such that the first cell 104 and the second cell 106 are receiving replicated data packets associated with a service, such as a real-time service.

In some cases, as the UE 102 moves (or after the UE 102 has moved) from the first position 114 to a second position 118 located within the second coverage area 116, the network device 108 may execute the handoff such that the UE 102 begins a communication session with the second cell 106. After the UE 102 and/or the second cell 106 initiates the communication session, the network device 108 may cease from providing data packet(s) 110(a) to the first cell 104 and continue to provide the data packets 110(B) to the second cell 106. The network device 108 may repeat the process as the UE 102 moves to different coverage areas and experiences handoffs with a number of different cells.

In some cases, after the UE 102 has provide an indication to the network device 108 that the UE 102 is going to experience a handoff, the network device 108 may determine which second cell 106 (e.g., destination cell) to provide the data packets to in parallel with the first cell 104 (e.g., current cell). For example, in some cases, the network device 108 may determine the second cell 106 based on location information associated with the UE 102. In some cases, the location information may be provided to the network device 108 by the UE 102 (e.g., via the communication session with the first cell 104). In other cases, the network device 108 may triangulate the location of the UE 102 with respect to an edge of the first coverage area 112. Once the network device 108 determines a location of the UE 102, the network device 108 may determine which second cell 106 that the UE 102 will be performing the handoff with and begin sending the data packet(s) 110(b) to the second cell 106 and data packet(s) 110(a) to the first cell 104 in parallel. In some cases, the network device 108 may calculate a probability of which destination cell that UE 102 is likely to perform the handoff with.

In some cases, the network device 108 may determine to transmit data packets to the first cell 104 and the second cell 106 (and/or multiple other cells) in parallel based on network metrics associated with the UE 102 and/or the network. For example, the network device 108 may monitor, or otherwise receive, network metrics associated with the UE 102 (e.g., signal strength, call quality, etc.) and determine that one or more metrics have dropped below a threshold. In some cases, the network device 108 may determine that the UE 102 will participate in a handoff with the second cell 106 based on the one or more metrics dropping below the threshold and start transmitting the data packet(s) 110(a) and 110(b) to both the first cell 104 and the second cell 106 (and/or multiple other cells) in parallel.

Figure 2:
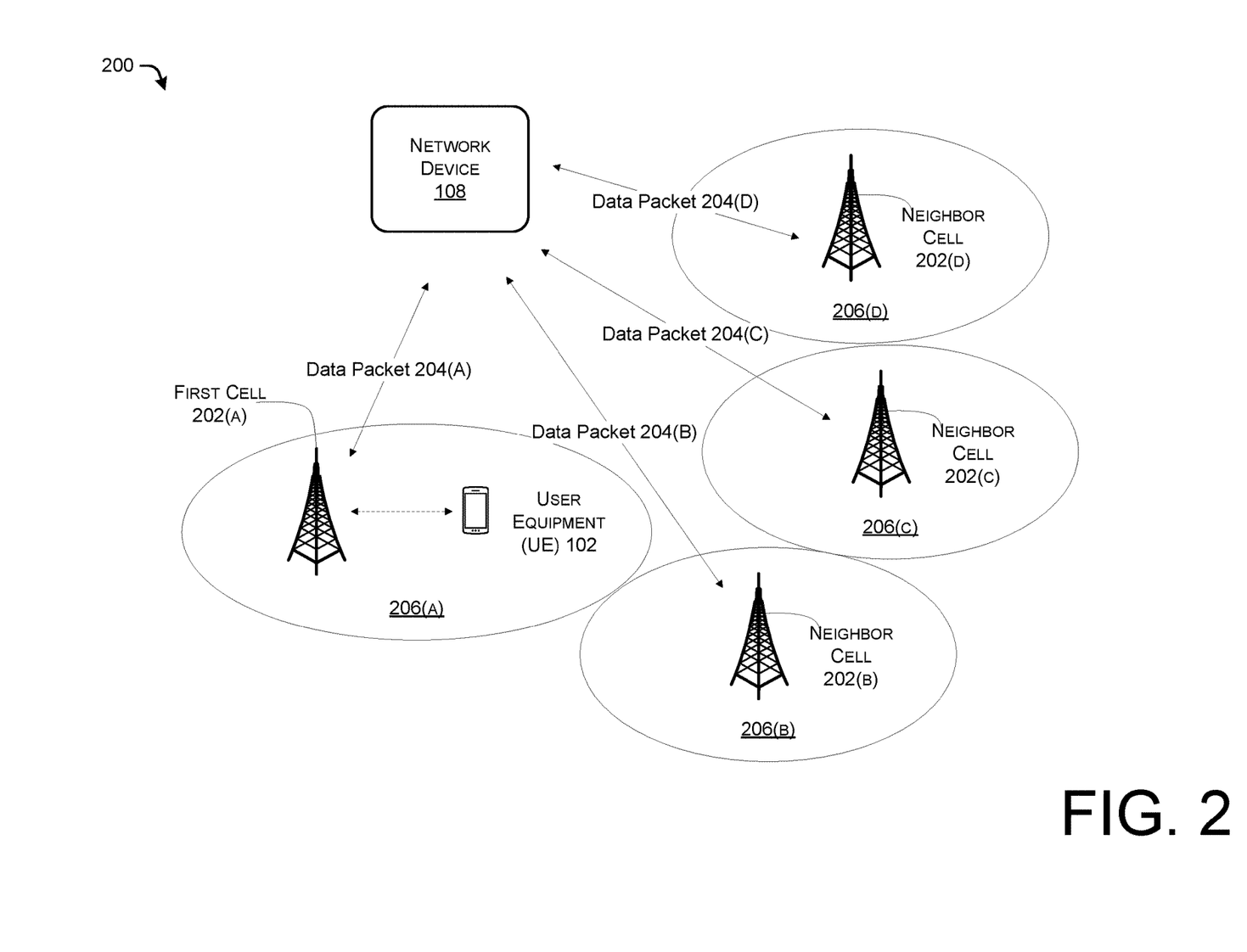
FIG. 2 illustrates another example environment for parallel routing of data packets prior to and/or during a handoff event.

FIG. 2 illustrates an example environment 200 for parallel transmission of data packets. The example environment 200 illustrated in FIG. 2 includes some constituents of the example environment 100 described above with reference to FIG. 1. For instance, the example environment 200 includes the UE 102 and the network device 108 described above with reference to FIG. 1.

In the examples illustrated in FIG. 2, the network device 108 may transmit data packets to multiple cells in parallel prior to the UE performing the handoff. For example, the network device 108 may determine a first cell 202(a) that is currently in communication with the UE 102 (e.g., providing data packet(s) 204(a)) and a number of neighboring cells 202(b), 202(c), and/or 202(d), relative to the first cell 202(a) (e.g., current cell). In some cases, the network device 108 may receive a neighbor list from the first cell 202(a) and/or the UE 102 identifying the neighboring cells 202(b), 202(c), and/or 202(d). In some cases, the network device 108 may receive an indication from the UE 102 that the UE 102 is about to experience a handoff from the first cell 202(a) to a different cell located within a different coverage area. In some cases, the indication that the UE 102 provides the network device 108 may include identifying information associated with other cells, such as a neighbor list, and/or timing data indicating a time in which the UE 102 expects to handoff to the different cell. Once the network device 108 receives the indication from the UE 102 (e.g., identifying information associated with the second cell 106 and/or timing data), the network device 108 may transmit data packet(s) 204(b), 204(c), and/or 204(d) to the neighboring cells 202(b), 202(c), and/or 202(d) (e.g., multicast to the neighboring cells 202(b), 202(c), and/or 202(d)) based on the identifying information in the neighbor list. In some cases, the network device 108 may receive the neighbor list and select one or more of the neighboring cells 202(b), 202(c), and/or 202(d) in which to send the data packet(s) 204(b), 204(c), and/or 204(d) to in parallel with the first cell data packet(s) 204(a) of the first cell 202(a).

In some cases, as the UE 102 moves (or after the UE 102 has moved) from a first coverage area 206(a) associated with the first cell 202(a) to any neighboring coverage area 206(b), 206(c), and/or 206(d), the network device 108 may execute the handoff such that the UE 102 begins a communication session with the cell (e.g., neighboring cells 202(b), 202(c), and/or 202(d)) providing communication services in the given coverage area. After the UE 102 and/or the new cell initiates the communication session, the network device 108 may cease from providing data packet(s) 204(a) to the first cell 202(a) and continue to provide the data packet(s) (e.g., the data packet(s) 204(b), 204(c), and/or 204(d)) to the new cell (e.g., the neighboring cells 202(b), 202(c), and/or 202(d)) in communication with the UE 102. The network device 108 may repeat the process as the UE 102 moves to different coverage areas and experiences handoffs with a number of different cells.

In some cases, the network device 108 may determine to transmit data packets to the first cell 202(a) and the neighboring cells 202(b), 202(c), and/or 202(d) in parallel based on network metrics associated with the UE 102 and/or the network. For example, the network device 108 may monitor, or otherwise receive, network metrics associated with the UE 102 (e.g., signal strength, call quality, etc.) and determine that one or more metrics have dropped below a threshold. In some cases, the network device 108 may determine that the UE 102 will participate in a handoff with a new cell, such as the neighboring cells 202(b), 202(c), and/or 202(d), based on the one or more metrics dropping below the threshold and start transmitting the data packet(s) 204(a), 204(b), 204(c), and/or 204(d) to the first cell 202(a) and the neighboring cells 202(b), 202(c), and/or 202(d) in parallel. Although FIG. 2 illustrates three neighbor cells (e.g., 202(b), 202(c), and/or 202(d)) relative to the first cell 202(a), it is to be understood that any number of neighbor cells may receive data packets, such as the data packets, in parallel with the cell (e.g., the first cell 202(*a*)) that the UE 102 is currently participating in a communication session with.

Figure 3:
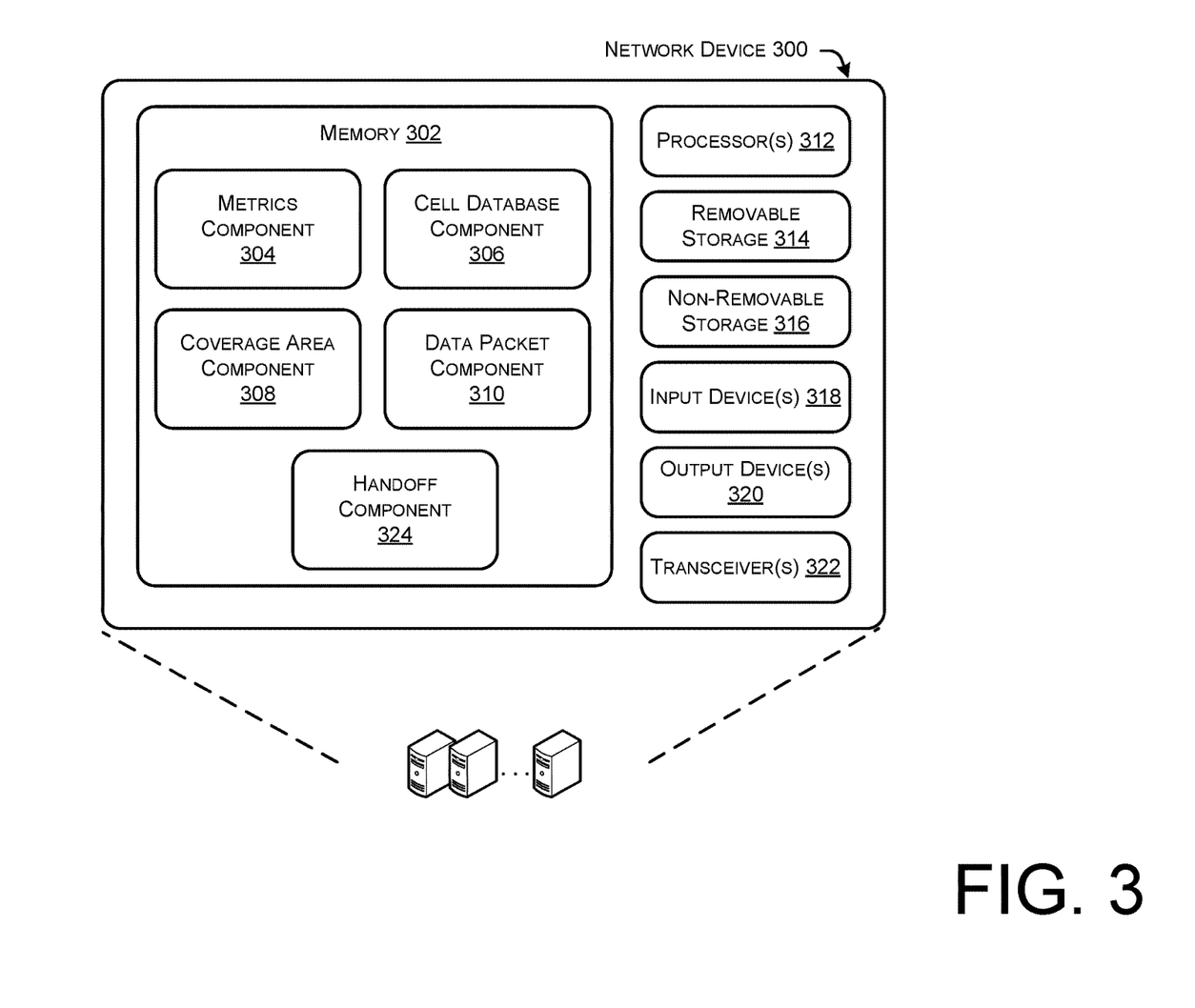
FIG. 3 illustrates an example network device configure to perform parallel routing of data packets prior to and/or during a handoff event.

FIG. 3 illustrates an example network device 300 configured to implement parallel routing of data packets, in accordance with configurations of the present disclosure. In some configurations, the network device 300 may correspond to the network device 108, the first cell 104, and/or the second cell 106 of FIG. 1. It is to be understood in the context of this disclosure that the network device 300 may be implemented as a single device or as a plurality of devices with components and data distributed among them.

As illustrated, the network device 300 comprises a memory 302 storing a metrics component 304, a cell database component 306, a coverage area component 308, an data packet component 310, and a handoff component 324. Also, the network device 300 includes processor(s) 312, a removable storage 314 and non-removable storage 316, input device(s) 318, output device(s) 320, and transceiver(s) 322.

In various configurations, the memory 302 is volatile (such as RAM), non-volatile (such as ROM, flash memory, etc.) or some combination of the two. The metrics component 304, the cell database component 306, the coverage area component 308, the data packet component 310, and the handoff component 324 stored in the memory 302 may comprise methods, threads, processes, applications or any other sort of executable instructions. The metrics component 304, the cell database component 306, the coverage area component 308, and the data packet component 310 may also include files and databases.

The metrics component 304 may include functionality to receive one or more metrics determined and/or captured by UE, as discussed herein. In some configurations, the metrics component 304 may receive a plurality of metrics and store the metrics in a database. In some configurations, the metrics may be indexed by location, time, UE, and the like. In some configurations, the metrics component 304 may perform any statistical analysis on the metrics to determine a variety of signal characteristics. For example, the metrics component 304 may determine a signal type (e.g., TV, radio, cell phone, etc.) as well as quantitate or qualitative characteristics of the signal.

The cell database component 306 may store locations of cells (e.g., base stations) in a database. Further, the cell database component 306 may receive location data and/or metrics associated with a signal to determine which cell corresponds to the metrics. In some configurations, the cell database component 306 may determine a confidence value associated with the identity of a cell.

The coverage area component 308 may include functionality to determine areas in which cells are located and handoffs may be performed. For example, the coverage area component 308 may determine areas around a current cell where metrics are to be determined. In some configurations, the coverage area component 308 may determine areas neighboring coverage areas in which a UE may travel to in order to perform a handoff. In some configurations, the coverage area component 308 may send indications of the coverage area locations to one or more UE to collect metrics, as discussed herein.

The data packet component 310 may include functionality to replicate data packets and send replicated data packets to multiple cells in parallel. For example, the data packet component 310 may send a replicated data packets to a destination cell and a current cell prior to the UE performing a handoff from the current cell to the destination cell. In some cases, the data packet component 310 may cease sending data packets to the previous cell once the handoff is complete.

The handoff component 324 may include functionality to generate handoff instructions including one or more thresholds for determining when to hand off UEs from one cell of the wireless communication network and/or one cell channel to another cell and/or cell channel, as will be discussed further herein. The handoff instructions may be provided to UEs 102 and/or other network devices 300 (e.g., the first cell 104 and/or the second cell 106).

In some configurations, the processor(s) 312 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by the network device 300. Any such tangible computer-readable media may be part of the network device 300.

The network device 300 may include input device(s) 318, such as a keypad, a cursor control, a touch-sensitive display, etc. Also, the network device 300 may include output device(s) 320, such as a display, speakers, etc. These devices are well known in the art and need not be discussed at length here.

As illustrated in FIG. 3, the network device 300 may include one or more wired or wireless transceiver(s) 322. In some wireless configurations, to increase throughput, the transceiver(s) 322 may utilize multiple-input/multiple-output (MIMO) technology. The transceiver(s) 322 may be any sort of wireless transceivers capable of engaging in wireless, radio frequency (RF) communication. The transceiver(s) 322 may also include other wireless modems, such as a modem for engaging in Wi-Fi, WiMax, Bluetooth, infrared communication, or the like.

Figure 4:
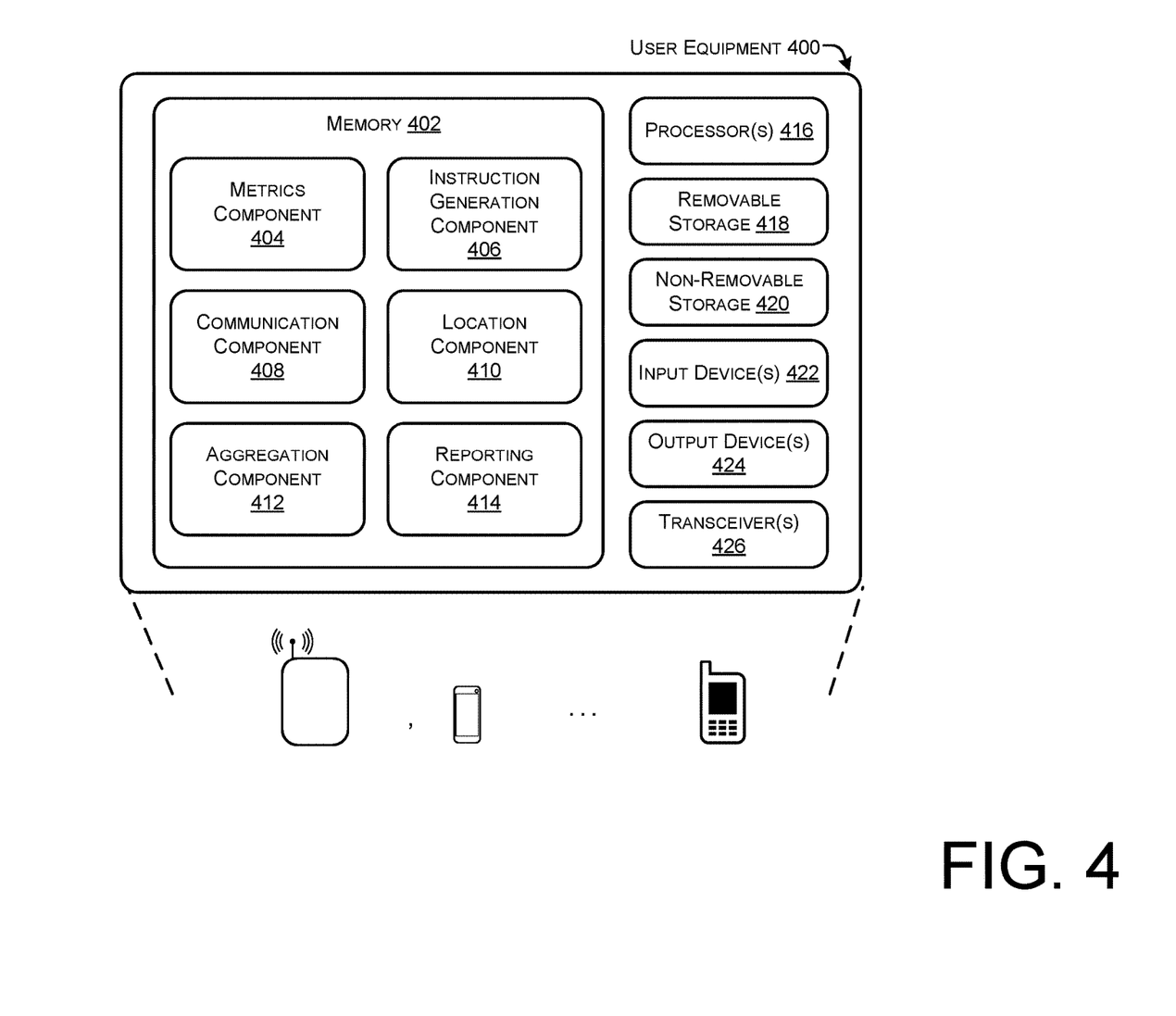
FIG. 4 illustrates an example UE configured to participate in a handoff event.

FIG. 4 illustrates an example UE 400, e.g., mobile device, configured to participate in a handoff and receive data packets from multiple cells in parallel, in accordance with configurations of the present disclosure. In some configurations, the UE 400 may correspond to the UE 102 of FIG. 1. It is to be understood in the context of the present disclosure that the UE 400 may be implemented as a single device or as a plurality of devices with components and data distributed among them.

As illustrated, the UE 400 comprises a memory 402 storing a metrics component 404, an instruction generation component 406, a communication component 408, a location component 410, a aggregation component 412, and a reporting component 414. Also, the UE 400 may include processor(s) 416, a removable storage 418 and non-removable storage 420, input device(s) 422, output device(s) 424, and transceiver(s) 426.

In various configurations, memory 402 is volatile (such as RAM), non-volatile (such as ROM, flash memory, etc.) or some combination of the two. The metrics component 404, the instruction generation component 406, the communication component 408, the location component 410, the aggregation component 412, and the reporting component 414 stored in the memory 402 may comprise methods, threads, processes, applications or any other sort of executable instructions. The metrics component 404, the instruction generation component 406, the communication component 408, the location component 410, the aggregation component 412, and the reporting component 414 may also include files and databases.

In some configurations, the metrics component 404 may include functionality to determine one or more metrics associated with a signal received, detected, or otherwise monitored by the UE 400. For example, the metrics component 404 may determine metrics including, but not limited to, audio data packet losses, audio data packet loss rates, etc., for a specific bandwidth in the frequency domain. In some configurations, the metrics component 404 may determine metrics including, but not limited to RSSI, RSRP, RSRQ, SINR, power density and the like for a specific bandwidth in the frequency domain. In some configurations, information may be associated with the metrics, such as a band number, channel number, block identifier, and the like. In some configurations, the metrics component 404 may scan a frequency resource at any regular or irregular interval, or may initiate a scan based on an internal or external trigger or command. For example, the metrics component 404 may receive an instruction from a remote network device to initiate a scan. In some configurations, the metrics component 404 may determine operating conditions or characteristics of the UE 400 (e.g., a power resource, location, etc.), and a command to initiate scanning may be based at least in part on those operating conditions or characteristics. In some configurations, the metrics component 404 may include previously-collected measurements. In some configurations, the metrics component 404 may sample conditions of a signal over a period of time and perform a statistical analysis to determine additional metrics (e.g., average, median, high, low, etc.) associated with the signal.

In some configurations, the metrics component 404 may be implemented as an application operating on the UE 400. In some configurations, to initiate a scan of one or more frequency resources, the spectrum analyzer component may call an API (application programming interface) implemented in an operating system on the UE 400.

In some configurations, the metrics component 404 may include functionality to present a user interface on the UE 400, for example, to receive an indication from a user enabling or disabling a spectrum analyzer mode of the metrics component 404. For example, in some configurations, a user of the UE may turn on or turn off the metrics component 404 based on personal preferences, incentives from a service provider, inclusion in a voluntary program, and the like.

The instruction generation component 406 may include functionality to query a chipset of the UE 400, and/or to query the transceiver(s) 426, to instruct the transceiver(s) 426 and/or any software or hardware to scan one or more channels or frequency resources to determine metrics associated with the channel or frequency resources, for example. In some configurations, the instruction generation component 406 may include a first API to receive instructions from the metrics component 404 and to provide data to the metrics component 404, and a second API to issue instructions to software or hardware associated with a modem or the transceiver(s) 426 and to receive data from such components. In some configurations, the instruction generation component 406 may include a third API to receive handover instruction(s). Based on the handoff instruction(s), the instruction generation component 406 may generate one or more instructions for the UE 400 to change cells and/or cell channels.

The communication component 408 may include functionality to conduct communications with one or more other devices, e.g., other UEs 400, network devices 108, cells (e.g., first cell 104, second cell 106, etc.) etc., as discussed herein. In some configurations, the communication component 408 may conduct a communication via a first set of frequency resources, while the metrics component 404 may analyze a second set of frequency resources. In some configurations, the communication component 408 may receive data packets from cells within the telecommunication network. For example, the communication component 408 may receive data packets from a first cell, such as the first cell 104, may travel to a different coverage area and perform a handoff with a second cell, such as the second cell 106, and receive data packets from the second cell without interruption of a service (e.g., real-time service) associated with the data packets.

The location component 410 may include functionality to determine a location of the UE 400. In some configurations, the location component 410 may determine a location based at least in part on GPS location data, base station identity, Wi-Fi access point identity, or a combination of location sources. In some configurations, a location may include a mobile network code (MNC) and a mobile country code (MCC) used in combination to uniquely identify a mobile network carrier network. In some configurations, the location component 410 may determine a base station or cell identity, and/or latitude, longitude, altitude information, and timestamp information. In some configurations, the location may be determined in connection with determining one or more metrics associated with a signal or channel. In some configurations, the location may be provided to a network device, for example, for aggregation and analysis. In some configurations, the location component 410 may determine a location of the UE 400 relative to a location of a geofenced location. For example, the location component 410 may receive a geofenced location from a network device.

The aggregation component 412 may include functionality to aggregate signal strength information and audio data packet loss information associated with the UE 400, including one or more of transmission information. For example, the aggregation component 412 may evaluate RSSI, RSRP, MCC, MNC, network type information, location information received from the location component 410, time and/or date information, etc., and save the metrics to the removable storage 418 and/or the non-removable storage 420. As discussed hereafter, one or more triggering events may cause the UE 400 to transmit the signal strength information by retrieving the metrics from the removable storage 418 and/or the non-removable storage 420, and transmitting the signal strength information via the transceiver(s) 426 to the network device(s) 108.

The reporting component 414 may include functionality to store one or more metrics associated with one or more frequency resources and to send such metrics to a network device, such as the network device 108. In some configurations, the reporting component 414 may send the one or more metrics to a network device as the one or more metrics are generated, captured, or determined. In some configurations, the reporting component 414 may send the metrics to the network device. In some configurations, the reporting component 414 may send the metrics based on a connection type of the UE 400 (e.g., when the UE 400 is connected to a Wi-Fi network). In some configurations, the reporting component 414 may send the metrics at a time of low network congestion (e.g., at night). In some configurations, the reporting component 414 may transmit metrics in response to a query from a network device, for example. In some cases, the reporting component 414 may send an indication to the network device indicating that the UE 400 is going to perform a handoff with another cell, based on one or more data collected by the aggregation component 412. In some configurations, the reporting component 414 may encode the data sent to a network device such that a service provider tracking data usage does not count the data against a quota associated with the UE 400.

In some configurations, the processor(s) 416 is a central processing unit (CPU), a graphics processing unit (GPU), or both CPU and GPU, or other processing unit or component known in the art.

The UE 400 may also include additional data storage devices (removable and/or non-removable) such as, for example, magnetic disks, optical disks, or tape. Such additional storage is illustrated in FIG. 4 by removable storage 418 and non-removable storage 420. Tangible computer-readable media may include volatile and non-volatile, removable and non-removable media implemented in any method or technology for storage of information, such as computer readable instructions, data structures, program modules, or other data. Memory 402, removable storage 418 and non-removable storage 420 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which may be used to store the desired information and which may be accessed by the UE 400. Any such tangible computer-readable media may be part of the UE 400.

In various configurations, the UE 400 may also include applications including but not limited to, a web browser application, a video streaming application, an online gaming application, a spectrum analyzer, and the like. During execution on the UE 400, each of the applications may be configured to cause the UE 400 to initiate data communications with the network device(s) 108.

The UE 400 may be configured to communicate over a wireless communication network using any common wireless and/or wired network access technology. Moreover, the UE 400 may be configured to run any compatible device operating system (OS), including but not limited to, Microsoft Windows Mobile, Google Android, Apple iOS, Linux Mobile, as well as any other common UE OS.

The UE 400 also may include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4, the UE 400 also includes one or more wired or wireless transceiver(s) 426. For example, the transceiver(s) 426 may include a network interface card (NIC), a network adapter, a LAN adapter, or a physical, virtual, or logical address to connect to various network(s), or to the network device(s) 108, for example. To increase throughput when exchanging wireless data, the transceiver(s) 426 may utilize multiple-input/multiple-output (MIMO) technology. The transceiver(s) 426 may comprise any sort of wireless transceivers capable of engaging in wireless, radio frequency (RF) communication. The transceiver(s) 426 may also include other wireless modems, such as a modem for engaging in Wi-Fi, WiMax, Bluetooth, infrared communication, and the like.

Figure 5:
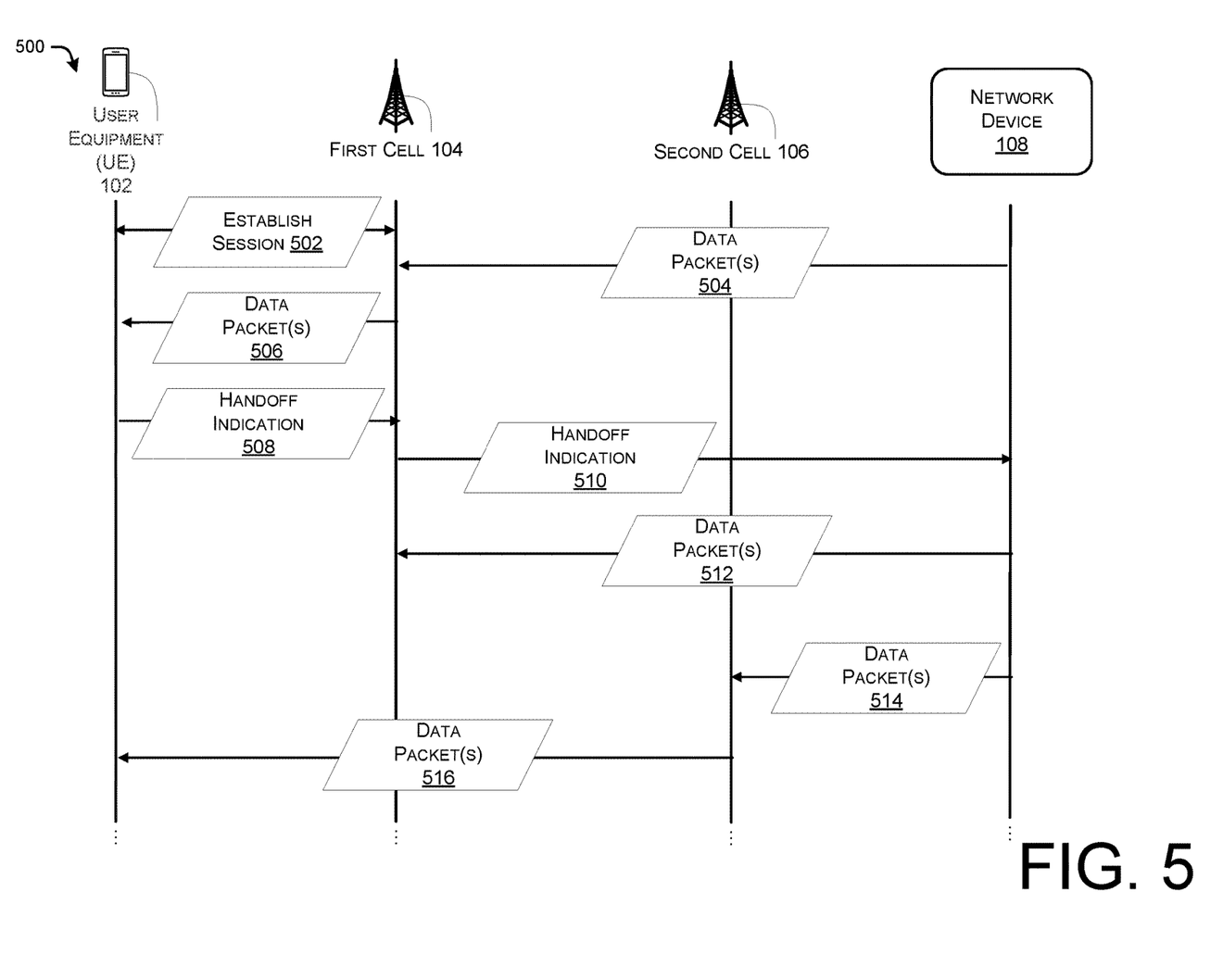
FIG. 5 illustrates example signaling for performing parallel routing of data packets prior to and/or during a handoff event.

FIG. 5 illustrates a flow diagram 500 of signals that may be transmitted in order to perform parallel routing of data packets between the UE 102, the first cell 104, the second cell 106, and the network device 108.

At 502, the UE 102 may establish a communication session with the first cell 104. For example, the first UE 102 may be located within a coverage area associated with the first cell 104 and may communicate with the first cell 104 via the communication component 408 of the first UE 102.

At 504, the network device 108 may transmit data packet(s), such as data packet(s) 110(a), of a service, such as a real-time service (e.g., instant messaging, voice-over (Vo) internet protocol (IP) video calling, navigation control of autonomous vehicles, online gaming, etc.) to the first cell 104 (e.g., base station).

At 506, the first cell 104 may be in communication with the UE 102 and provide the data packet(s) to the UE 102 while the UE 102 is located at a first position, such as the first position 114.

At 508, the first cell 104 may receive an indication from the UE 102 that the UE 102 is about to experience a handoff from the first cell 104 to the second cell 106 located within a second coverage area, such as the second coverage area 116. In some cases, the indication that the UE 102 provides the first cell 104 may include identifying information associated with the second cell 106 (e.g., cell identifier) and/or timing data indicating a time in which the UE 102 expects to handoff to the second cell 106. In some cases, the handoff indication may include metrics data associated with a signal received, detected, or otherwise monitored by the UE 102. For example, the UE 102 may determine metrics including, but not limited to, audio data packet losses, audio data packet loss rates, etc., for a specific bandwidth in the frequency domain. In some configurations, the UE 102 may determine metrics including, but not limited to RSSI, RSRP, RSRQ, SINR, power density and the like for a specific bandwidth in the frequency domain. In some configurations, information may be associated with the metrics, such as a band number, channel number, block identifier, and the like. In some configurations, the UE 102 may scan a frequency resource at any regular or irregular interval, or may initiate a scan based on an internal or external trigger or command. For example, the UE 102 may receive an instruction from a remote network device to initiate a scan. In some configurations, the UE 102 may determine operating conditions or characteristics of the UE 102 (e.g., a power resource, location, etc.), and a command to initiate scanning may be based at least in part on those operating conditions or characteristics. In some configurations, the UE 102 may include previously-collected measurements. In some configurations, the UE 102 may sample conditions of a signal over a period of time and perform a statistical analysis to determine additional metrics (e.g., average, median, high, low, etc.) associated with the signal.

In some cases, the handoff indication may include location data associated with the UE 102. For example, a location component of the UE 102 may include functionality to determine a location of the UE 102. In some configurations, the UE 102 may determine a location based at least in part on GPS location data, base station identity, Wi-Fi access point identity, or a combination of location sources. In some configurations, a location may include a mobile network code (MNC) and a mobile country code (MCC) used in combination to uniquely identify a mobile network carrier network. In some configurations, the UE 102 may determine a base station or cell identity, and/or latitude, longitude, altitude information, and timestamp information. In some configurations, the location may be determined in connection with determining one or more metrics associated with a signal or channel. In some configurations, the location may be provided to a network device, for example, for aggregation and analysis. In some configurations, the UE 102 may determine a location of the UE 102 relative to a location of a geofenced location. For example, the UE 102 may receive a geofenced location from a network device.

At 510, the first cell 104 may send the handoff indication to the network device 108 and once the network device 108 receives the indication, the network device 108 may to send data packet(s) in parallel to both the first cell 104 and the second cell 106. In some cases, the network device may determine that the UE 102 is going to experience a handoff event based on the identifying information associated with the second cell 106, the timing data, the metrics data, and/or the location data.

At 512 and at 514, the network device may transmit data packet(s), such as the data packet(s) 110(*a*), to the first cell 104 and data packet(s), such as the data packets 110(*b*), to the second cell 106 in parallel. In some examples, the data packets 110(*a*) and the data packets 110(*b*) may include the same content such that the first cell 104 and the second cell 106 are receiving replicated data packets associated with a service, such as a real-time service.

At 516, as the UE 102 moves (or after the UE 102 has moved) from the first position to a second position located within the second coverage area, the network device 108 may execute the handoff such that the UE 102 begins a communication session with the second cell 106 and receives the data packet(s) from the second cell 106.

Figure 6:
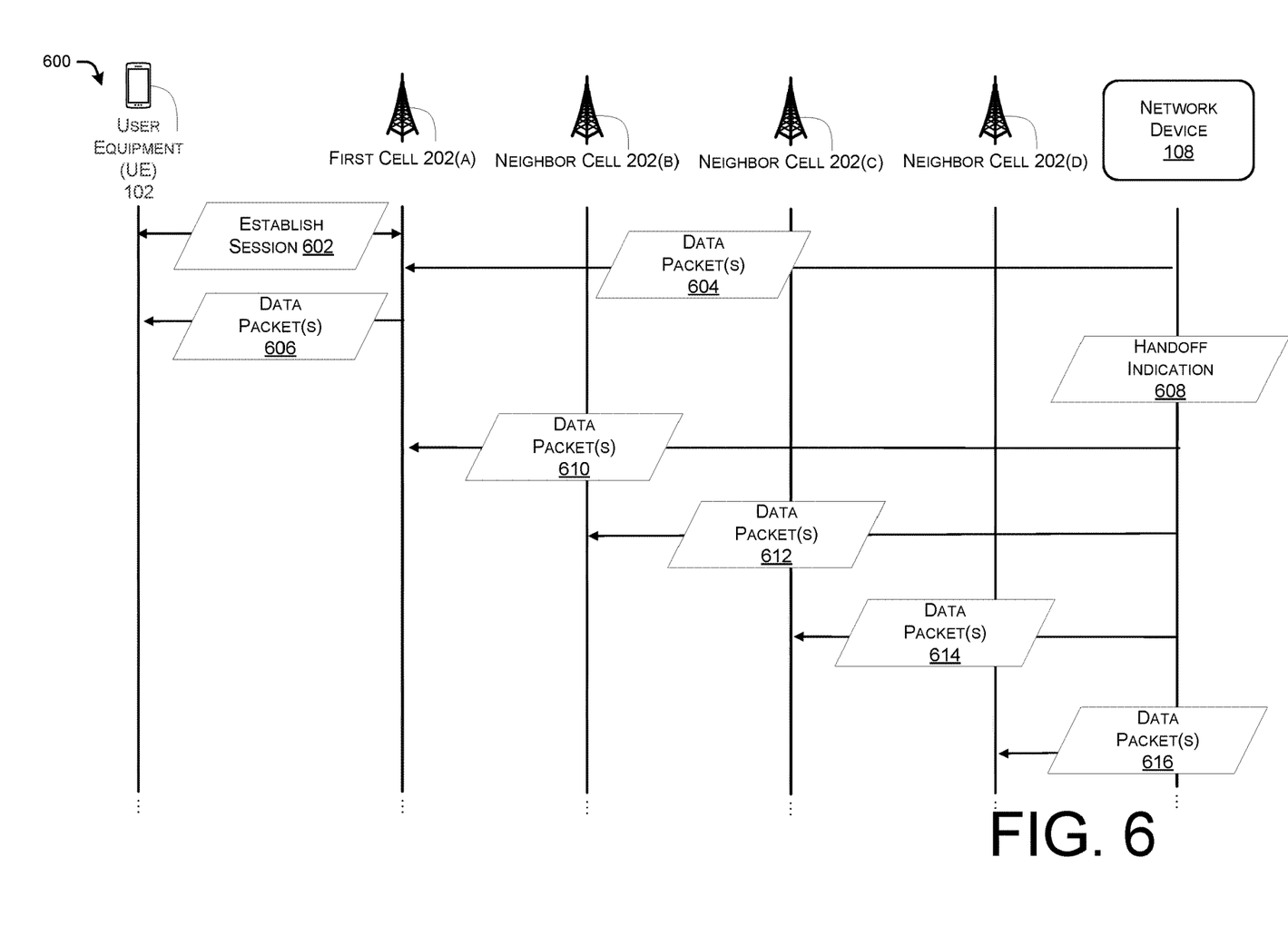
FIG. 6 illustrates another example signaling for parallel routing of data packets prior to and/or during a handoff event.

FIG. 6 illustrates a flow diagram 600 of signals that may be transmitted in order to perform parallel routing of data packets between the UE 102, the first cell 202(*a*), neighboring cells 202(*b*), 202(*c*), and/or 202(*d*), and the network device 108.

At 602, the UE 102 may establish a communication session with the first cell 202(*a*). For example, the first UE 102 may be located within a coverage area associated with the first cell 202(*a*) and may communicate with the first cell 202(*a*) via the communication component 408 of the first UE 102.

At 604, the network device 108 may transmit data packet(s), such as data packet(s) 204(*a*), of a service, such as a real-time service (e.g., instant messaging, voice-over (Vo) internet protocol (IP) video calling, navigation control of autonomous vehicles, online gaming, etc.) to the first cell 202(*a*) (e.g., base station).

At 606, the first cell 202(*a*) may be in communication with the UE 102 and provide the data packet(s) to the UE 102 while the UE 102 is located at a first position.

At 608, the network device 108 may determine that the UE 102 is about to experience a handoff from the first cell 104 to a second cell located within a second coverage area. In some cases, the network device 108 may monitor, or otherwise receive, network metrics associated with the UE 102 (e.g., signal strength, call quality, etc.) and determine that one or more metrics have dropped below a threshold. In some cases, the network device 108 may determine that the UE 102 will participate in a handoff with a new cell, such as the neighboring cells 202(*b*), 202(*c*), and/or 202(*d*), based on the one or more metrics dropping below the threshold. In some cases, the network device 108 may identify the neighboring cells 202(*b*), 202(*c*), and/or 202(*d*) based on a neighbor list provided to the network device 108 by the UE 102 and/or the first cell 202(*a*).

At 610, 612, 614, and 616, the network device 108 may transmit data packet(s), such as data packet(s) 204(*b*), 204(*c*), and/or 204(*d*), to the neighboring cells 202(*b*), 202(*c*), and/or 202(*d*) (e.g., multicast to the neighboring cells 202(*b*), 202(*c*), and/or 202(*d*)) based on the identifying information in the neighbor list. In some cases, the network device 108 may receive the neighbor list and select one or more of the neighboring cells 202(*b*), 202(*c*), and/or 202(*d*) in which to send the data packet(s) 204(*b*), 204(*c*), and/or 204(*d*) to in parallel with the first cell data packet(s) 204(*a*) of the first cell 202(*a*).

Figure 7:
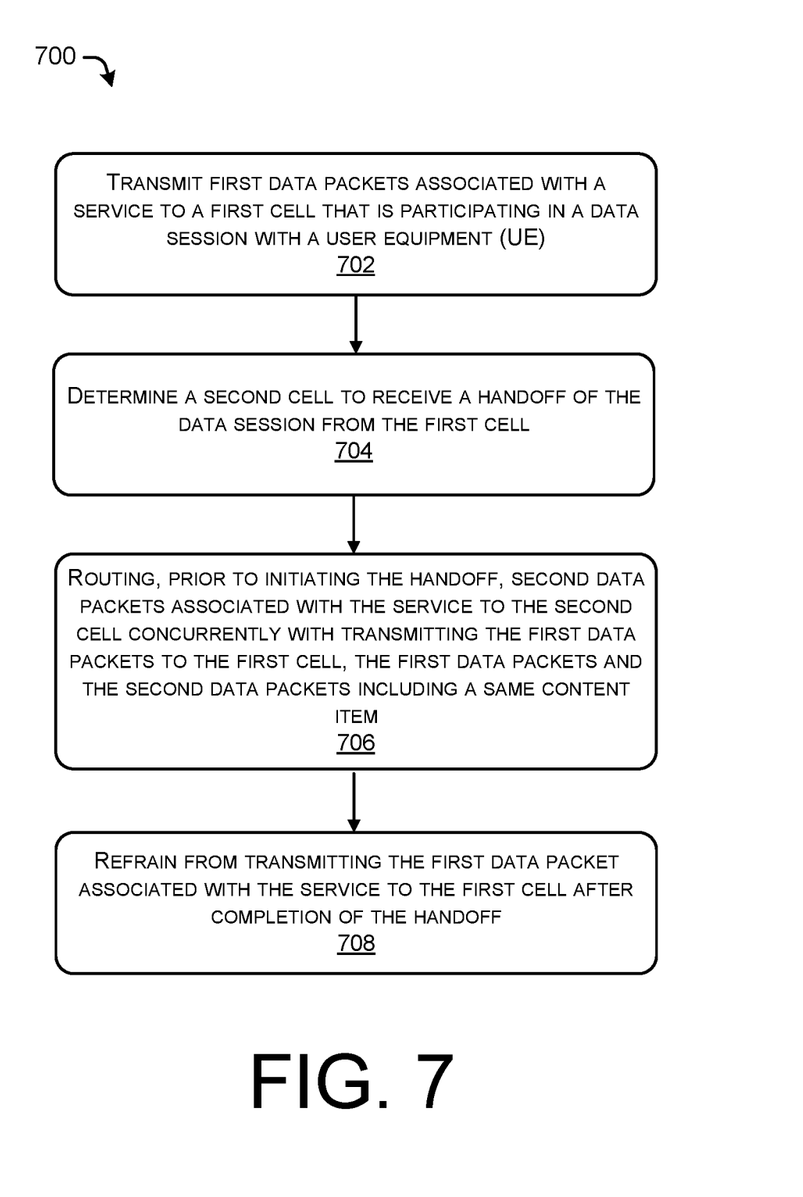
FIG. 7 illustrates a process for parallel routing of data packets prior to and/or during a handoff event.
Figure 8:
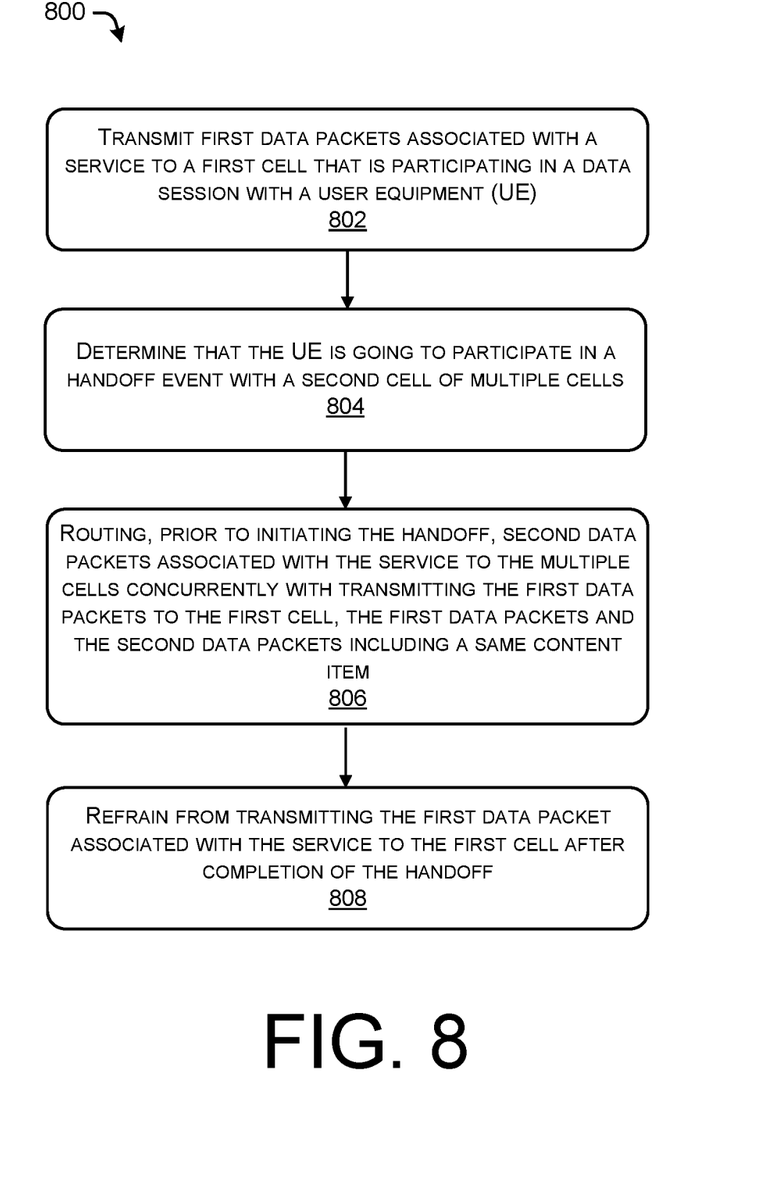
FIG. 8 illustrates another process for parallel routing of data packets prior to and/or during a handoff event.

FIGS. 7 and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 7 illustrates a process 700 for parallel routing of data packets prior to and/or during a handoff event. In various implementations, the process 700 can be performed by a network device (e.g., network device 108, network device 300, etc.) transmitting data packets in a telecommunication network.

At 702, the process includes transmitting first data packets associated with a service to a first cell that is participating in a data session with a user equipment (UE). For example, the network device 108 may transmit data packet(s) 110(*a*) of a service, such as a real-time service (e.g., instant messaging, voice-over (Vo) internet protocol (IP) video calling, navigation control of autonomous vehicles, online gaming, etc.) to the first cell 104 (e.g., base station) located within a first coverage area 112. The first cell 104 may be in communication with the UE 102 and provide the data packet(s) 110(*a*) to the UE 102 while the UE 102 is located at a first position 114.

At 704, the process includes determining a second cell to receive a handoff of the data session from the first cell. For example, the network device 108 may receive an indication from the UE 102 that the UE 102 is about to experience a handoff from the first cell 104 to the second cell 106 located within a second coverage area 116. In some cases, the indication that the UE 102 provides the network device 108 may include identifying information associated with the second cell 106 (e.g., cell identifier) and/or timing data indicating a time in which the UE 102 expects to handoff to the second cell 106.

At 706, the process includes routing, prior to initiating the handoff, second data packets associated with the service to the second cell concurrently with transmitting the first data packets to the first cell, the first data packets and the second data packets including a same content item. For example, once the network device 108 receives the indication from the UE 102 (e.g., identifying information associated with the second cell 106 and/or timing data), the network device 108 may transmit data packet(s) 110(b) to the second cell 106 and data packet(s) 110(a) to the first cell 104 in parallel. In some examples, the data packets 110(a) and the data packets 110(b) may include the same content such that the first cell 104 and the second cell 106 are receiving replicated data packets associated with a service, such as a real-time service.

At 708, the process includes refraining from transmitting the first data packet associated with the service to the first cell after completion of the handoff. For example, after the UE 102 and/or the second cell 106 initiates the communication session, the network device 108 may cease from providing data packet(s) 110(a) to the first cell 104 and continue to provide the data packets 110(B) to the second cell 106.

FIG. 8 illustrates a process 800 for parallel routing of data packets prior to and/or during a handoff event. In various implementations, the process 800 can be performed by a network device (e.g., network device 108, network device 300, etc.) transmitting data packets in a telecommunication network.

At 802, the process includes transmitting first data packets associated with a service to a first cell that is participating in a data session with a user equipment (UE). For example, the network device 108 may transmit data packet(s) 110(a) of a service, such as a real-time service (e.g., instant messaging, voice-over (Vo) internet protocol (IP) video calling, navigation control of autonomous vehicles, online gaming, etc.) to the first cell 104 (e.g., base station) located within a first coverage area 112. The first cell 104 may be in communication with the UE 102 and provide the data packet(s) 110(a) to the UE 102 while the UE 102 is located at a first position 114.

At 804, the process includes determining that the UE is going to participate in a handoff event with a second cell of multiple cells. For example, in some cases, the network device 108 may determine the second cell 106 based on location information associated with the UE 102. In some cases, the location information may be provided to the network device 108 by the UE 102 (e.g., via the communication session with the first cell 104). In other cases, the network device 108 may triangulate the location of the UE 102 with respect to an edge of the first coverage area 112. In some cases, the network device 108 may determine a first cell 202(a) that is currently in communication with the UE 102 (e.g., providing data packet(s) 204(a)) and a number of neighboring cells 202(b), 202(c), and/or 202(d), relative to the first cell 202(a) (e.g., current cell). In some cases, the network device 108 may receive a neighbor list from the first cell 202(a) and/or the UE 102 identifying the neighboring cells 202(b), 202(c), and/or 202(d).

At 806, the process includes routing, prior to initiating the handoff, second data packets associated with the service to the multiple cells concurrently with transmitting the first data packets to the first cell, the first data packets and the second data packets including a same content item. For example, the network device 108 may transmit data packet(s) 204(b), 204(c), and/or 204(d) to the neighboring cells 202(b), 202(c), and/or 202(d) (e.g., multicast to the neighboring cells 202(b), 202(c), and/or 202(d)) based on the identifying information in the neighbor list. In some cases, the network device 108 may receive the neighbor list and select one or more of the neighboring cells 202(b), 202(c), and/or 202(d) in which to send the data packet(s) 204(b), 204(c), and/or 204(d) to in parallel with the first cell data packet(s) 204(a) of the first cell 202(a).

At 808, the process includes refraining from transmitting the first data packet associated with the service to the first cell after completion of the handoff. For example, after the UE 102 and/or the new cell initiates the communication session, the network device 108 may cease from providing data packet(s) 204(a) to the first cell 202(a) and continue to provide the data packet(s) (e.g., the data packet(s) 204(b), 204(c), and/or 204(d)) to the new cell (e.g., the neighboring cells 202(b), 202(c), and/or 202(d)) in communication with the UE 102.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   transmitting first data packets associated with a service to a first cell that is participating in a data session with a user equipment (UE);
   determining a second cell to receive a handoff of the data session from the first cell;
   routing, prior to initiating the handoff, second data packets associated with the service to the second cell concurrently with transmitting the first data packets to the first cell, the first data packets and the second data packets including a same content item; and
   refraining from transmitting the first data packets associated with the service to the first cell after completion of the handoff.

2. The computer-implemented method of claim 1, further comprising:
   receiving a handoff notification from the UE indicating the second cell and a time of the handoff; and
   based on receiving the handoff notification, initiating the routing of the second data packets to the second cell concurrently with transmitting the first data packets to the first cell.

3. The computer-implemented method of claim 1, further comprising:
   determining a probability and/or a triangulation of a location of the UE with respect to the first cell;
   determining an identity of the second cell based on the probability and/or the triangulation of the location of the UE; and
   routing the second data packets to the second cell concurrently with transmitting the first data packets to the first cell without a handoff notification from the UE.

4. The computer-implemented method of claim 1, further comprising:
   determining a time of the handoff of the data session based on at least one network metric;
   determining an identity of the second cell based on an identity of the first cell;

prior to the time of the handoff, routing the second data packets to the second cell concurrently with transmitting the first data packets to the first cell; and routing the second data packets to the second cell concurrently with transmitting the first data packets to the first cell during the handoff.

5. The computer-implemented method of claim 1, further comprising:

determining a time of the handoff of the data session based on at least one network metric;

determining multiple neighbor cells of the first cell; and prior to the handoff, multicasting data packets having the same content item as the first data packets and the second data packets to the multiple neighbor cells concurrently with transmitting the first data packets to the first cell.

6. The computer-implemented method of claim 5, further comprising:

determining an identity of the second cell from among the multiple neighbor cells; and routing the second data packets to the second cell site after completion of the handoff.

7. The computer-implemented method of claim 5, further comprising receiving a neighbor list from at least one of the UE or the first cell and determining the multiple neighbor cells based at least in part on the neighbor list.

8. A system comprising:

at least one processor; and memory storing instructions that, when executed by the at least one processor, cause the at least one processor to perform operations comprising:

transmitting first data packets associated with a service to a first cell that is participating in a data session with a user equipment (UE);

determining a second cell to receive a handoff of the data session from the first cell;

routing, prior to initiating the handoff, second data packets associated with the service to the second cell concurrently with transmitting the first data packets to the first cell, the first data packets and the second data packets including a same content item; and refraining from transmitting the first data packets associated with the service to the first cell after completion of the handoff.

9. The system of claim 8, further comprising:

receiving a handoff notification from the UE indicating the second cell and a time of the handoff; and based on receiving the handoff notification, initiating the routing of the second data packets to the second cell concurrently with transmitting the first data packets to the first cell.

10. The system of claim 8, further comprising:

determining a probability and/or a triangulation of a location of the UE with respect to the first cell;

determining an identity of the second cell based on the probability and/or the triangulation of the location of the UE; and routing the second data packets to the second cell concurrently with transmitting the first data packets to the first cell without a handoff notification from the UE.

11. The system of claim 8, further comprising determining a time of the handoff of the data session based on at least one network metric;

determining an identity of the second cell based on an identity of the first cell;

prior to the time of the handoff, routing the second data packets to the second cell concurrently with transmitting the first data packets to the first cell; and routing the second data packets to the second cell concurrently with transmitting the first data packets to the first cell during the handoff.

12. The system of claim 8, further comprising:

determining a time of the handoff of the data session based on at least one network metric;

determining multiple neighbor cells of the first cell; and prior to the handoff, multicasting data packets having the same content item as the first data packets and the second data packets to the multiple neighbor cells concurrently with transmitting the first data packets to the first cell.

13. The system of claim 12, further comprising:

determining an identity of the second cell from among the multiple neighbor cells; and routing the second data packets to the second cell after completion of the handoff.

14. The system of claim 12, further comprising receiving a neighbor list from at least one of the UE or the first cell and determining the multiple neighbor cells based at least in part on the neighbor list.

15. The system of claim 12, wherein the service comprises a real-time communication service.

16. A method comprising:

transmitting first data packets associated with a service to a first cell that is participating in a data session with a user equipment (UE);

determining that the UE is going to participate in a handoff event with a second cell of multiple cells;

routing, prior to initiating the handoff event, second data packets associated with the service to the multiple cells concurrently with transmitting the first data packets to the first cell, the first data packets and the second data packets including a same content item; and refraining from transmitting the first data packets associated with the service to the first cell after completion of the handoff event.

17. The method of claim 16, further comprising:

receiving a handoff notification from the UE indicating the second cell and a time of the handoff event; and based on receiving the handoff notification, initiating the routing of the second data packets to the second cell concurrently with transmitting the first data packets to the first cell.

18. The method of claim 16, further comprising:

determining a probability and/or a triangulation of a location of the UE with respect to the first cell;

determining an identity of the second cell based on the probability and/or the triangulation of the location of the UE; and routing the second data packets to the second cell concurrently with transmitting the first data packets to the first cell without a handoff notification from the UE.

19. The method of claim 16, further comprising:

determining a time of the handoff event of the data session based on at least one network metric;

determining an identity of the second cell based on an identity of the first cell;

prior to the time of the handoff event, routing the second data packets to the second cell concurrently with transmitting the first data packets to the first cell; and routing the second data packets to the second cell concurrently with transmitting the first data packets to the first cell during the handoff event.

20. The method of claim 16, further comprising receiving a neighbor list from at least one of the UE or the first cell and determining the multiple cells based at least in part on the neighbor list.

* * * * *